United States Patent [19]

Dischert et al.

[11] Patent Number: 4,797,731
[45] Date of Patent: Jan. 10, 1989

[54] METHOD AND APPARATUS FOR COMPATIBLY LOCKING HORIZONTAL SYNC TO THE PAL SUBCARRIER

[75] Inventors: Lee R. Dischert, Burlington, N.J.; Robert J. Topper, Hatboro, Pa.

[73] Assignee: Matsushita Electric Industrial Co., Ltd., Osaka, Japan

[21] Appl. No.: 60,097

[22] Filed: Jun. 9, 1987

[51] Int. Cl.$^4$ .................... H04N 9/44; H04N 11/16
[52] U.S. Cl. ................................ 358/17; 358/16
[58] Field of Search ................. 358/17, 150, 16

[56] References Cited

U.S. PATENT DOCUMENTS

| | | | |
|---|---|---|---|
| 4,145,705 | 3/1979 | Yoshinaka | 358/19 |
| 4,178,607 | 12/1979 | Mikado | 358/17 |
| 4,450,474 | 5/1984 | Mizukami | 358/150 |
| 4,467,356 | 8/1984 | McCoy | 358/12 |
| 4,635,100 | 1/1987 | Hirakawa | 358/19 |
| 4,660,074 | 4/1987 | Schine | 358/17 |
| 4,661,840 | 4/1987 | Phelps | 358/16 |
| 4,679,005 | 7/1987 | Tatami | 358/17 |

*Primary Examiner*—John W. Shepperd
*Attorney, Agent, or Firm*—Amster, Rothstein & Ebenstein

[57] ABSTRACT

Circuits are provided for increasing the frequency of the standard PAL line sync signals so that they have the same phase relationship with the color subcarrier every fourth line. The generation of a standard PAL sync signal is achieved by generating a signal as just described and decreasing its horizontal frequency.

5 Claims, 3 Drawing Sheets

METHOD AND APPARATUS FOR COMPATIBLY LOCKING HORIZONTAL SYNC TO THE PAL SUBCARRIER

BACKGROUND OF THE INVENTION

In the present PAL color television system the color subcarrier is 25 Hertz more than an integral multiple of the horizontal scanning frequency for the purpose of making dot crawl from the color subcarrier less objectionable. This requires more complex circuits for generating the horizontal sync and subcarrier. Whereas this can be done with analog circuitry, the problem becomes complex when the signals are to be generated by digital means.

BRIEF SUMMARY OF THE INVENTION

In accordance with this invention the horizontal scanning frequency is increased by 25 times 4 divided by 1135 cycles a second. In order to keep the horizontal and vertical scanning frequencies locked, one line during each vertical blanking is increased by an amount required to compensate for the accumulated error. In a PAL system sampled at four times the subcarrier frequency, the additional time is two pixels.

Use of this horizontal sync frequency enables the horizontal and subcarrier frequencies to be locked every four lines while maintaining the beneficial effects of the 25 cycle offset.

Thus if PAL transmitters used this horizontal sync signal, there would be no difference in the operation of home receivers but the circuits for studio equipment that cooperates with a transmitter would be far simpler. On the other hand if the horizontal sync frequency remains as it is, the horizontal sync frequency just described could be derived from it and used by studio equipment. Because the phase of the horizontal sync with respect to the color subcarrier repeats every eight fields, it is far more difficult to attain tight phase lock between sync and the subcarrier than it would if the phase repeated every four lines as it would with the horizontal frequency suggested herein.

DETAILED DESCRIPTION OF THE INVENTION

Figure 1:
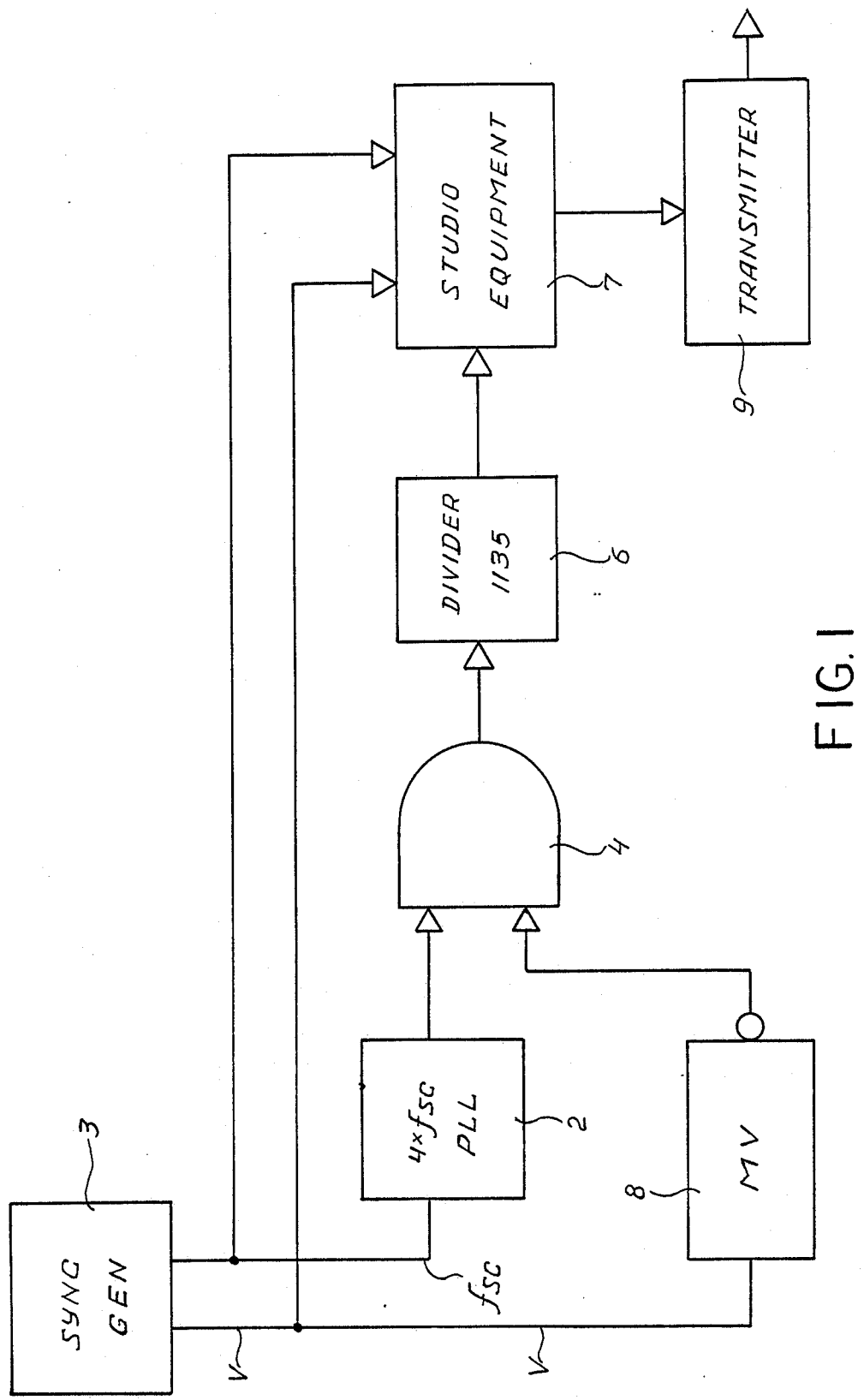
FIG. 1 is a block diagram of a circuit incorporating the invention in which the desired line scanning frequency is derived from PAL subcarrier or burst.

FIG. 1 has a phase locked loop 2 that multiplies the substitute frequency applied to it from a synch generator 3 by 4. It may operate in response to a burst of the PAL subcarrier frequency or the subcarrier frequency itself. The output of the loop 2 is applied to one input of an AND gate 4. The output of the AND gate 4 is divided by 1135 in a divider 6. Pulses from a vertical sync generator or separator are applied to a one shot circuit 8 so as to generate a pulse that is two pixels wide during each vertical blanking period. In this embodiment, the pulses are negative and are applied to the other input of the AND gate 4 so as to prevent the pulses applied to the input from reaching the output of the AND gate 4. Alternatively, the output of the one shot circuit 8 can be applied to the counter reset. Vertical synchronizing pulses and waves of the color subcarrier frequency as well as the line synchronizing pulses from the divider 6 are combined in any suitable manner in studio equipment 7 that supplies video signals to a transmitter 9.

Figure 2:
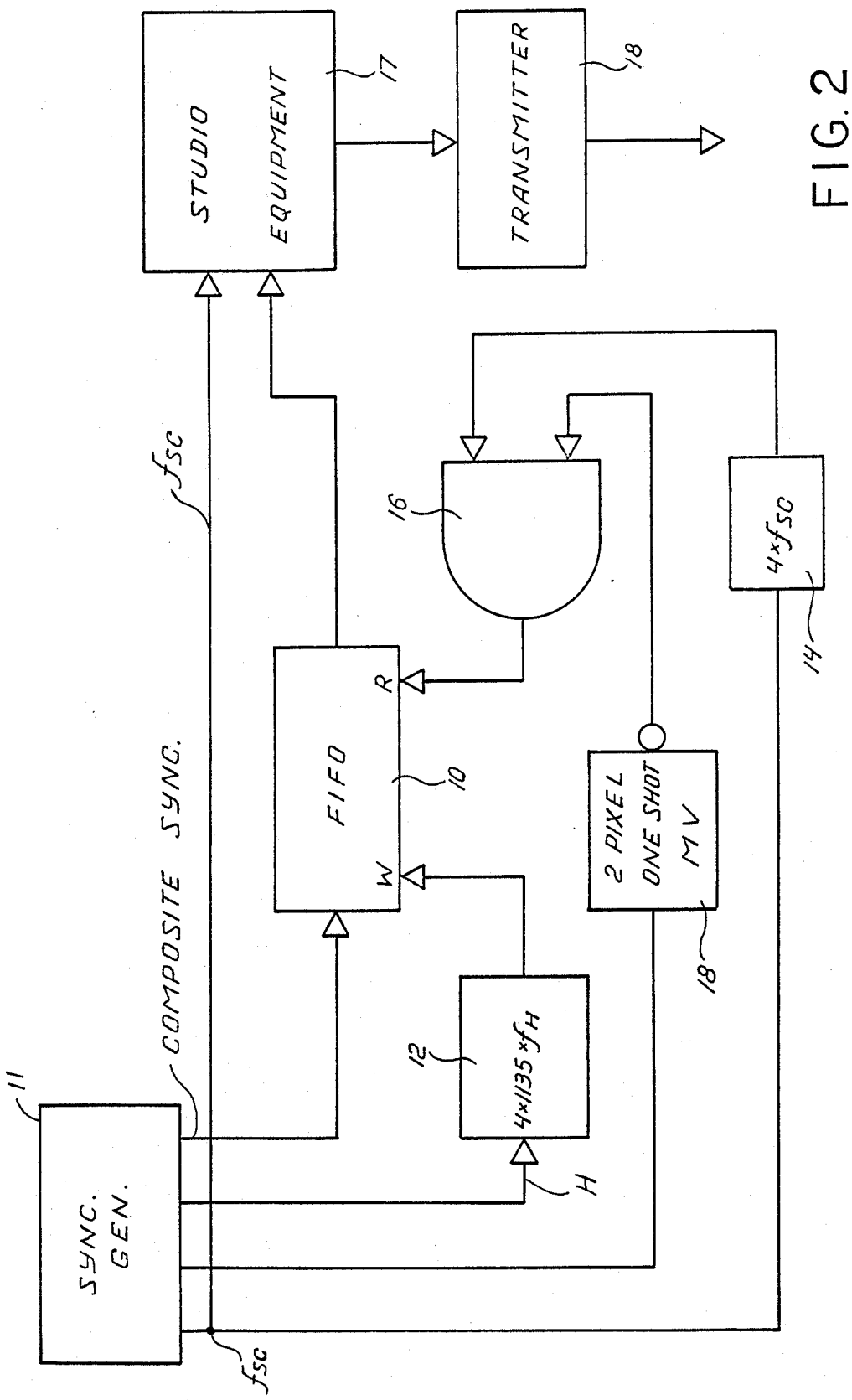
FIG. 2 is a block diagram of a circuit incorporating the invention in which the desired line scanning frequency is derived from the PAL line scanning frequency and subcarrier.

In FIG. 2 a PAL composite sync from a sync generator 11 is applied to a FIFO memory 10. Its write clock input is connected to means 12 for multiplying the line scanning frequency by 4×1135. The output of the FIFO 10 is the new PAL composite sync signal. A source 14 of a frequency equal to four times the subcarrier frequency is applied to one input of an AND gate 16. A vertical scanning frequency derived from the PAL composite sync is applied to a two pixel one shot circuit 18, and its output is applied to another input of the AND gate 16. The output of the AND gate 16 is applied to the read terminal of the FIFO 10. Vertical synchronizing pulses and waves of the color subcarrier frequency as well as the line synchronizing pulses from the FIFO 10 are combined in any suitable manner in studio equipment 17 that supplies video signals to a transmitter 18. Note that the read is faster than the write but the number of clock pulses in a field is the same because of the inhibiting by the AND gate 16.

Figure 3:
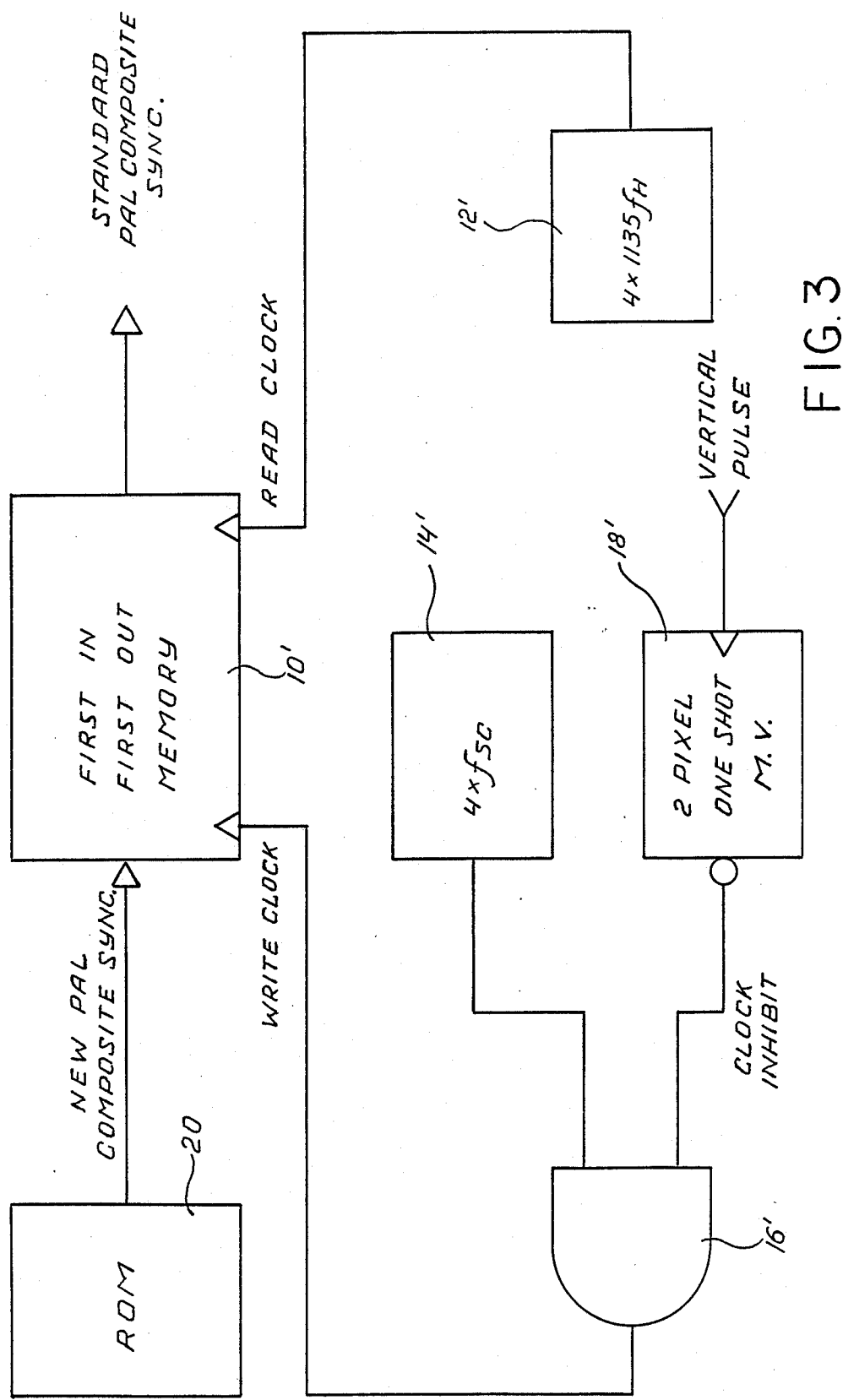
FIG. 3 shows a way of generating the standard PAL sync signals.

If a ROM were used to generate the standard PAL sync signals, it would have to store eight fields because this is the time it takes the phase relationship between horizontal sync and the color subcarrier to repeat. In accordance with another aspect of this invention, a far simpler way of generating the standard PAL sync signals is provided as illustrated in FIG. 3 in which components corresponding to those of FIG. 2 have the same designations primed. A ROM 20 that provides the new composite sync in which the horizontal sync has the same phase relationship with the color subcarrier every fourth line supplies signals to the input of the FIFO 10'. It only needs to be four lines long. The output of the multiplying means 12' is connected to the read clock input of the FIFO 10', and the output of the AND gate 16' is connected to the write clock input of the FIFO 10'. This slows the higher frequency sync signals provided by the ROM 20 to the standard PAL frequency.

We claim:

1. Apparatus for generating compatible synchronizing signals for use in a PAL color television system comprising:

a sync generator for providing standard synchronizing signals of a PAL system including waves of the subcarrier frequency, vertical synchronizing signals and line synchronizing signals, means responsive to signals provided by said sync generator for producing other line synchronizing signals having a frequency such that an integral number of quarter cycles of the subcarrier wave occur between them, there being an additional two quarter cycles between two line synchronizing signals occurring during a vertical blanking interval, and means coupled to said sync generator and to said means for producing said other line synchronizing signals for combining at least said vertical synchronizing signals and said other line synchronizing signals.

2. Apparatus as set fourth in claim 1 wherein the frequency of said other line synchronizing signals is 100/1135 Hz higher than the frequency of the standard line synchronizing signals.

3. Apparatus as set forth in claim 1 wherein said means for producing said other line synchronizing signals is comprised of:
    an ANDING means having two inputs and an output,
    means for coupling waves of four times the subcarrier frequency provided by said sync generator to one input of said ANDIND means, and
    a one shot circuit responsive to said vertical synchronizing signals for applying a signal to the other input of said ANDING means that turns it off for half a cycle of the subcarrier wave.

4. Apparatus as set forth in claim 1 wherein said means for producing said other line synchronizing signals is comprised of:
    a FIFO memory having a write input, a read output, a write terminal and a read terminal,
    means for coupling a composite sync signal including said standard line and vertical synchronizing signals provided by said sync generator to said write input,
    a multiplier coupled to said sync generator for applying to said write terminal a signal that is 1135 times the frequency of said standard line synchronizing signals,
    an ANDING means having an output connected to said read terminal and two inputs,
    means coupled to said sync generator for applying signal to one of said inputs a signal that is four times the frequency of the subcarrier wave, and
    a one shot circuit responsive to the vertical synchronizing signals provided by said sync generator for applying a signal to the other input of said ANDING means that turns it on except for a period of occurring during vertical blanking that has a duration of half a cycle of the subcarrier wave.

5. Apparatus for generating synchronizing signals for use in a PAL color television system comprising:
    a sync generator for supplying standard line and field synchronizing signals and a wave of standard subcarrier frequency,
    means responsive to signals supplied by said sync generator for producing other line synchronizing signals having a higher frequency than said standard synchronizing signals such that an integral number of quarter cycles of said subcarrier occur during line scanning intervals,
    means responsive to signals supplied by said sync generator for increasing the time between said other line synchronizing signals occurring during vertical blanking such that the average frequency of said other line synchronizing signals is the same as the average frequency of said standard line synchronizing signals, and
    means for combining the vertical synchronizing signals supplied by said sync generator with said other line synchronizing signals.

* * * * *